Jan. 26, 1960   B. COOPER ET AL   2,922,687
PRINTING AND PERFORATING TIME RECORDER
Filed Jan. 17, 1956   8 Sheets-Sheet 6
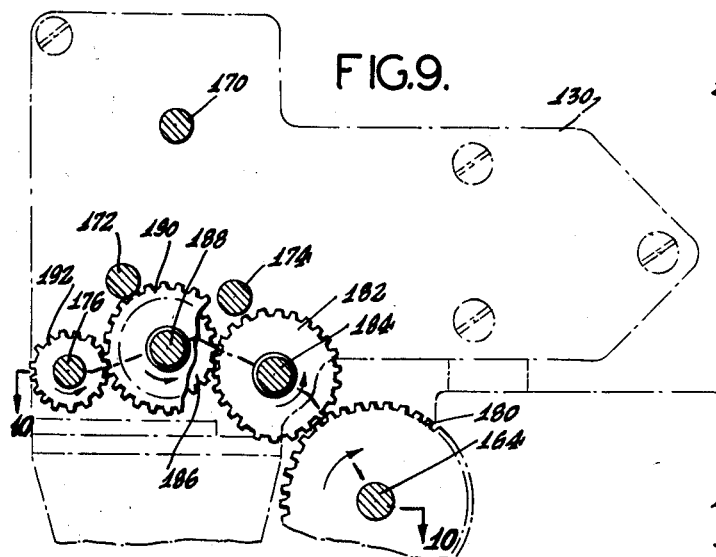
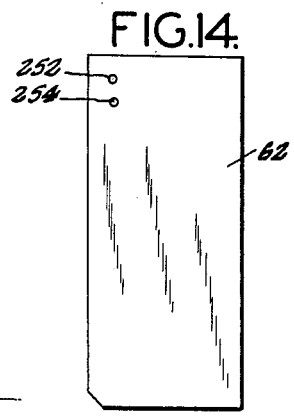
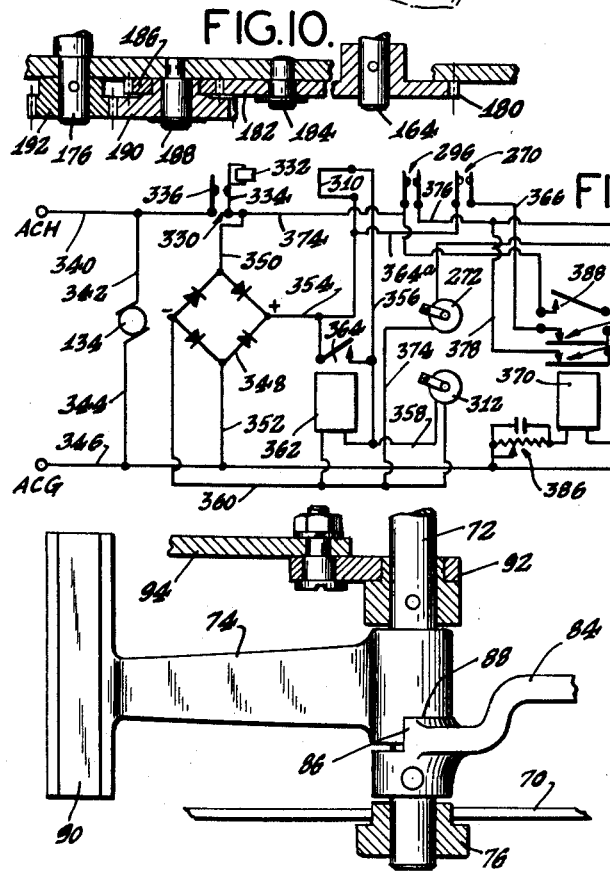
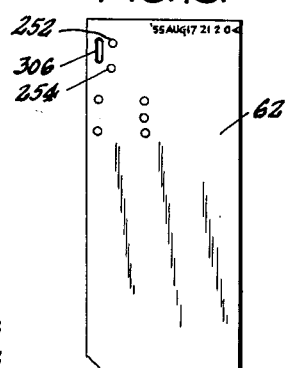
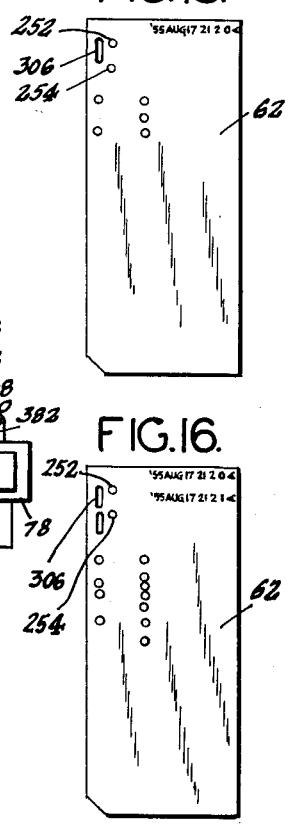
INVENTORS.
BENJAMIN COOPER
ALBERT HOHMANN
BY
J. B. Felshin
ATTORNEY.

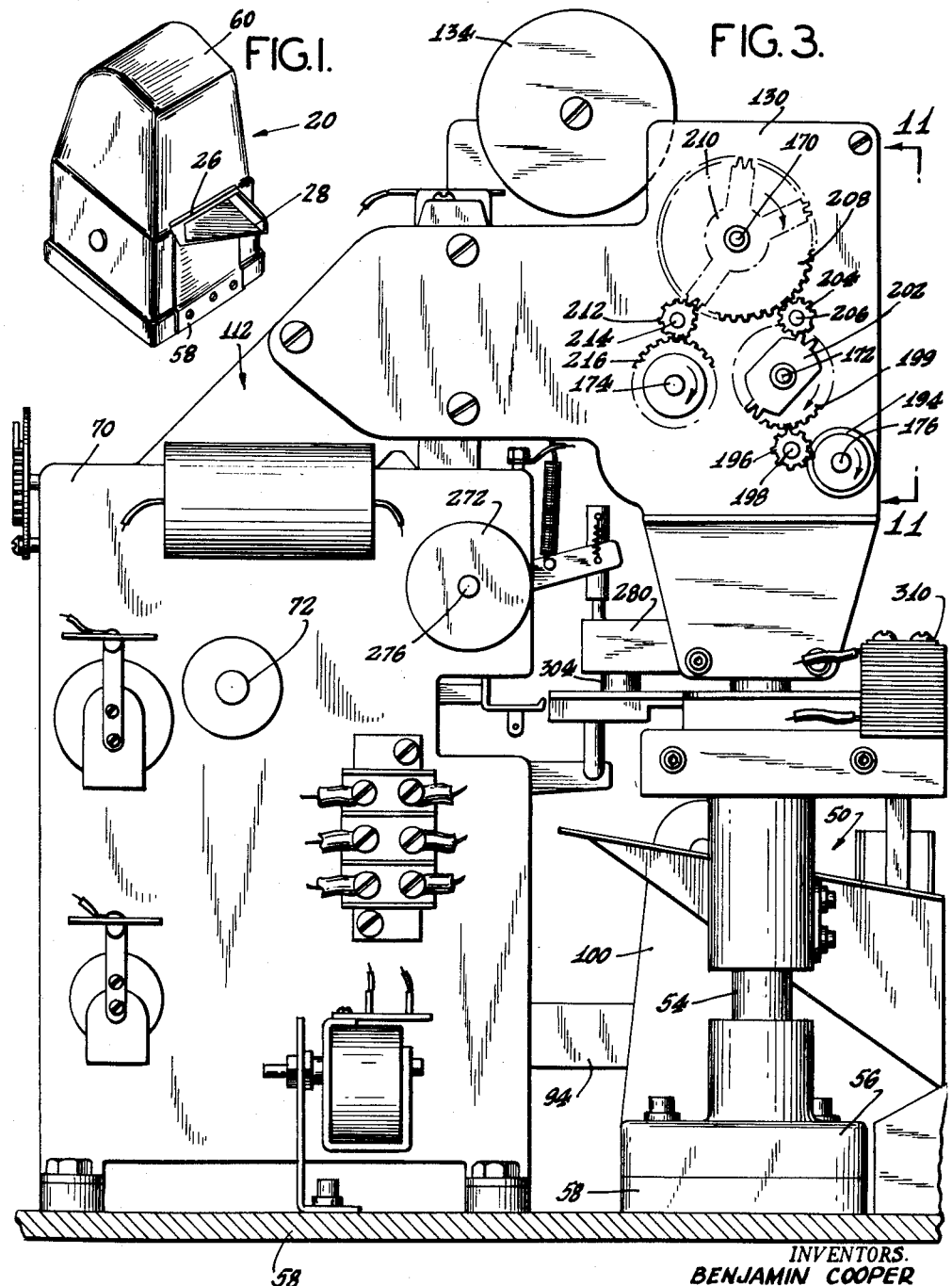

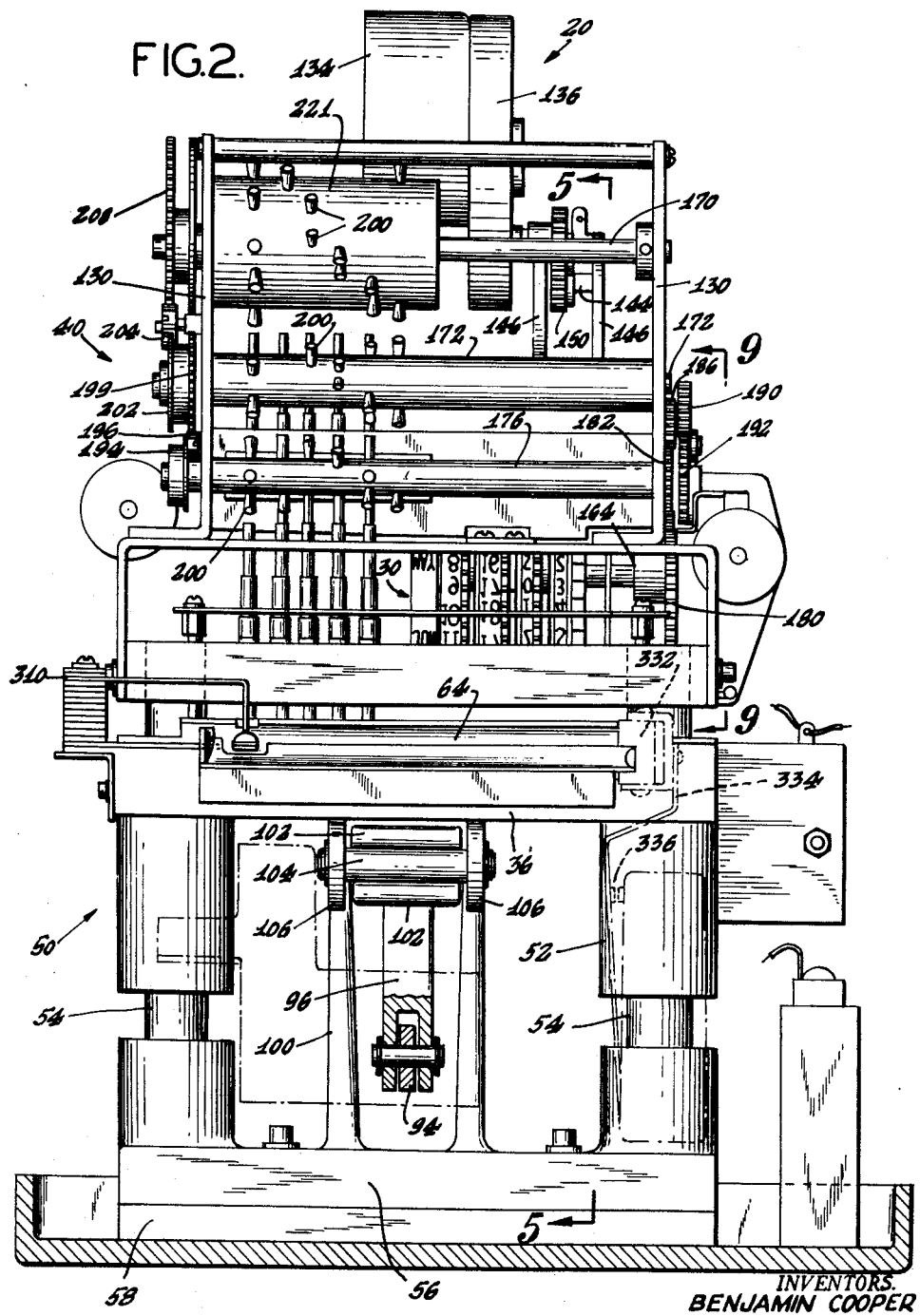

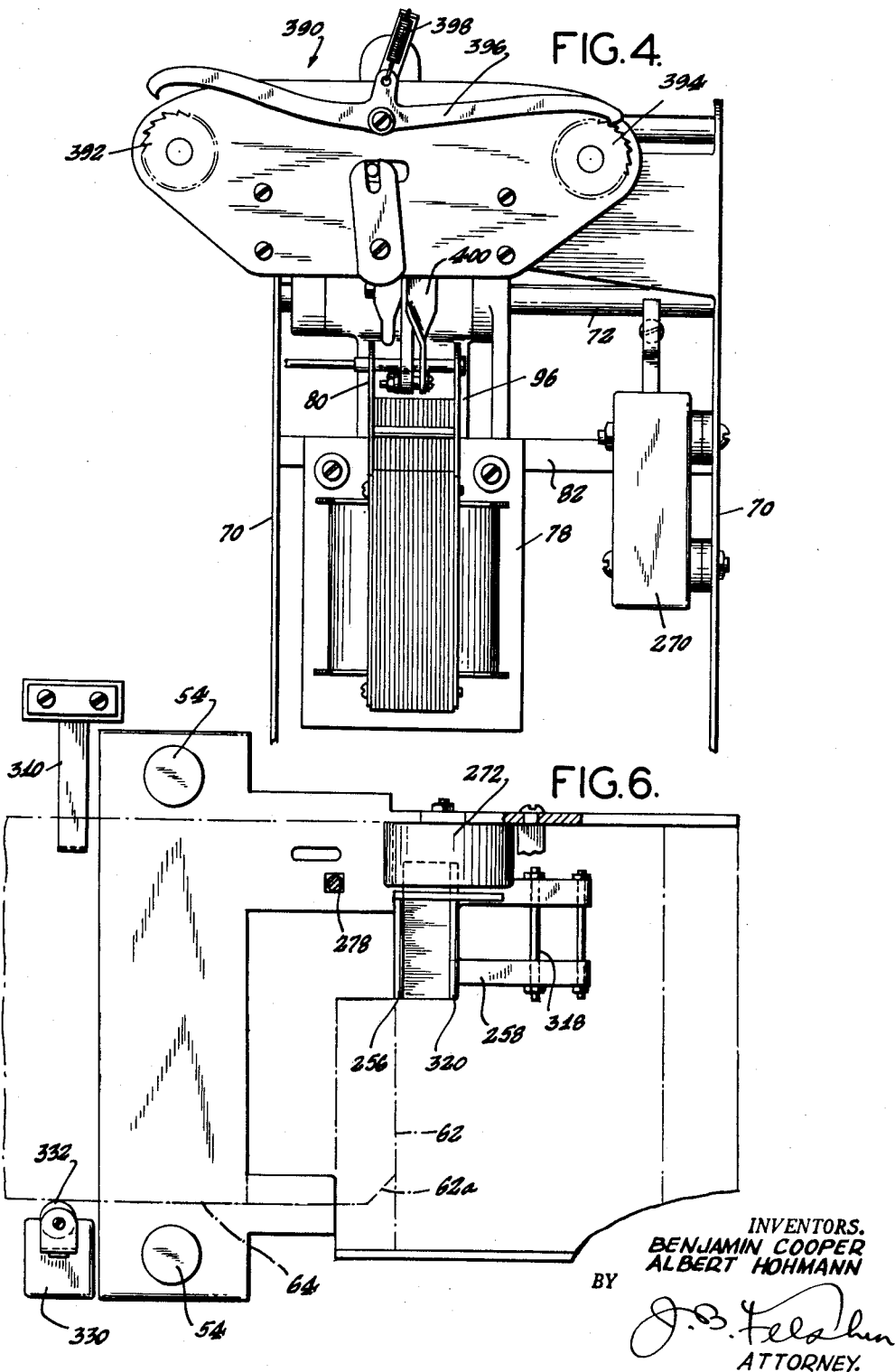

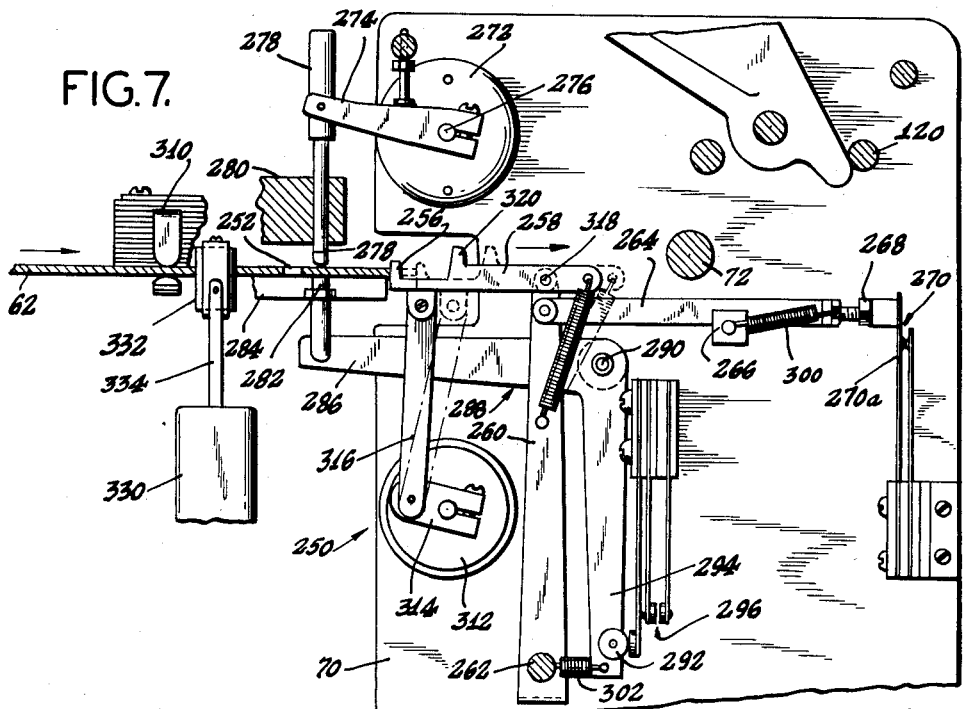
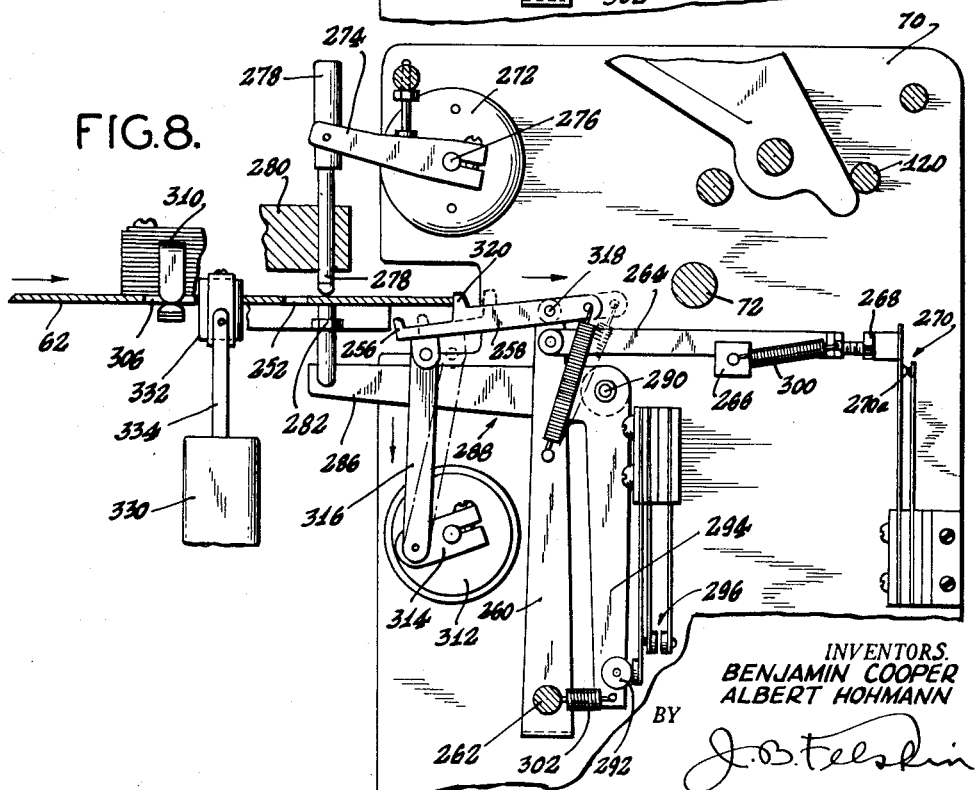

Jan. 26, 1960  B. COOPER ET AL  2,922,687
PRINTING AND PERFORATING TIME RECORDER
Filed Jan. 17, 1956  8 Sheets-Sheet 7

INVENTORS.
BENJAMIN COOPER
ALBERT HOHMANN
BY
ATTORNEY.

Jan. 26, 1960

B. COOPER ET AL 2,922,687

PRINTING AND PERFORATING TIME RECORDER

Filed Jan. 17, 1956

INVENTORS.
BENJAMIN COOPER
ALBERT HOHMANN
BY
*J. B. Felshin*
ATTORNEY.

United States Patent Office 2,922,687
Patented Jan. 26, 1960

2,922,687

PRINTING AND PERFORATING TIME RECORDER

Benjamin Cooper, Brooklyn, N.Y., and Albert Hohmann, Teaneck, N.J.; said Hohmann assignor to said Cooper Application January 17, 1956, Serial No. 559,612

3 Claims. (Cl. 346—66)

This invention relates generally to time recording devices and, in particular, to a novel time recording device which records time by printing indicia and punching perforation patterns representative of time in the well known tabulating machine punch card code. The present machine is adapted to receive a card therein which will automatically result in the time being printed thereon and concurrently therewith the punching of a perforation pattern representative of the printed time. Heretofore time cards, when utilized with tabulating punch card machines, required the preparation of a duplicate card on a key operated punch before such card could be utilized in the punch card accounting systems. The punch information eliminates any such manual preparation and/or duplication.

Accordingly, one of the principal objects of the invention is to provide an incremental time recording device having printing means for printing selectively, increments of successive time on a card and punching means for perforating the card with a codal pattern representative of the printed time. Further, the present invention provides a continuous time control wherein the printing and the punching control means continuously advance in predetermined increments.

Therefore, another object of the invention resides in the provision of continuously operating punch and printing control means.

The invention further provides means for positioning a card having time previously printed and punched therein in a differing position from the initial position automatically so that the later time may be printed and punched in a differing portion of the card without disturbing the codal pattern that was punched prior therein.

Therefore, a further object of the invention resides in the provision of card positioning means controlled by card perforations.

Still another object of the invention resides in the provision of a novel punch controlling means having a codal arrangement which advances in time increments to control the punches accordingly.

And still another object of the invention resides in the provision of a novel code and permutation means arranged in said punch controller.

A further object resides in the provision of means to accurately position the manually placed card relative to the punches whereby the perforations will be accurately positioned in the card and the card may be utilized and be readily acceptable in standard punch card tabulating machines.

And yet another object of the invention is to provide means for tilting and separating the punching means without interrupting the time control means for maintenance, inspection, etc.

Other ancillary objects will be, in part, hereinafter pointed out and will be, in part, hereinafter apparent.

In the drawings:

Figure 1 is an isometric projection of the time recorder with the cover thereon.

Figure 2 is a front elevation of the recording mechanisms with the cover removed.

Figure 3 is a side elevation of the recorder with the cover removed.

Figure 4 is a fragmentary detail of the prime actuating solenoid and ribbon reverse mechanism.

Figure 6 is a fragmentary plan view of the card receiving means illustrating a portion of the card controlling switch actuating mechanisms.

Figure 7 is a side elevation of the card responsive mechanisms for initiating a cycle of operation and positioning the card and also switches associated therewith, illustrating the card stop mechanism in its initial position.

Figure 8 is a side elevation of the card stop mechanism in its secondary position.

Figure 9 is a fragmentary side elevation taken in cross-section along 9—9 of Figure 2, illustrating the driving gear train.

Figure 10 is a cross-section view taken along line 10—10 of Figure 9.

Figure 12 is a fragmentary view of the printing hammer mechanism.

Figure 14 is a plan elevation of a card having the pre-perforated card positioning holes therein.

Figure 15 is a plan elevation of a card having an initial time designation printed thereon and punched therein.

Figure 16 is a plan elevation of a card having the initial time printed thereon and punched therein and a secondary time printed thereon and punched therein.

Figure 19 is a schematic diagram of the control circuit of the time recorder.

Figure 5:
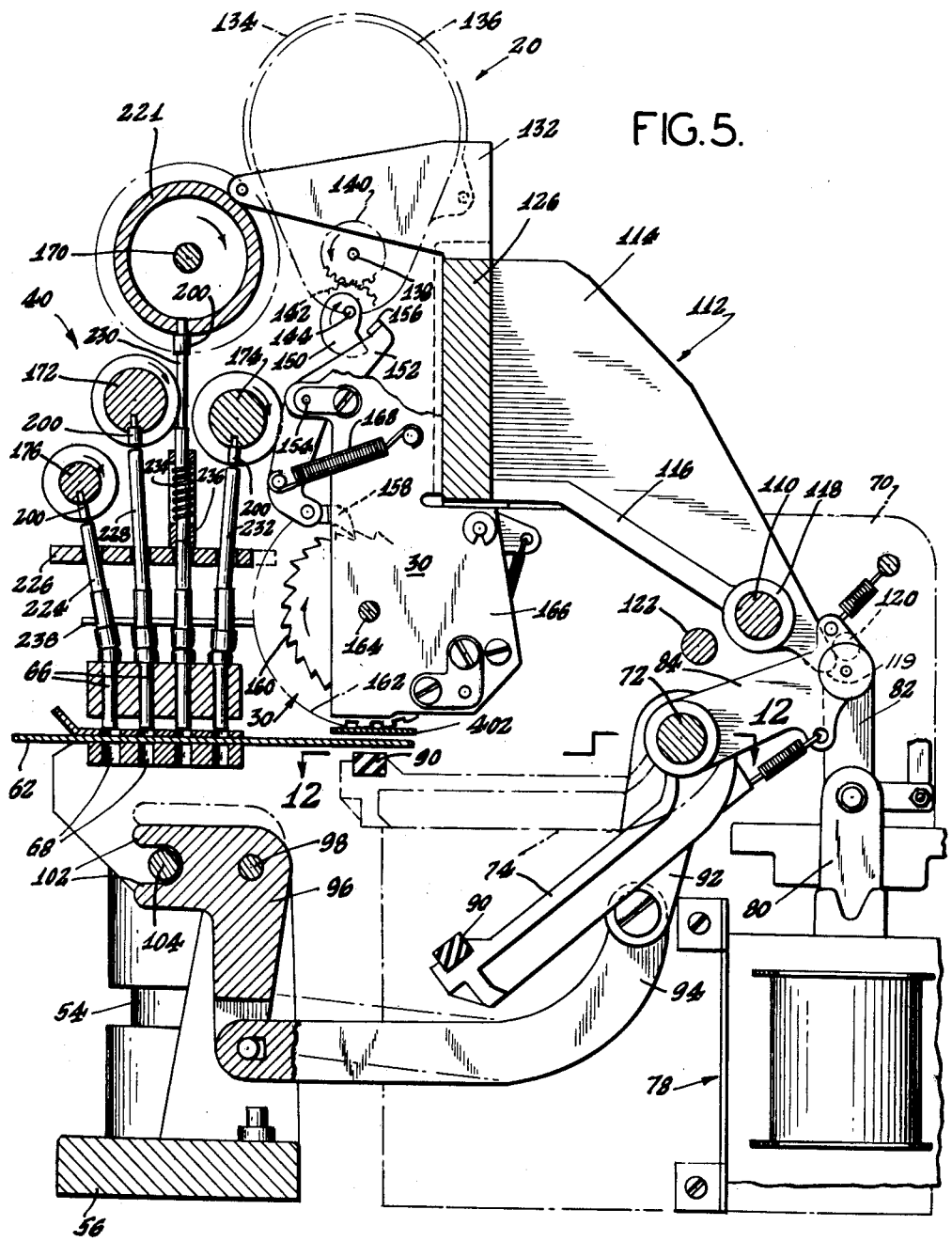
Figure 5 is a cross-sectional view taken along line 5—5 of Figure 2.

The present time recorder may be substantially described as an in and out recorder wherein a time check card is inserted therein and the time of insertion is printed thereon and punched in a tabulating code therein. The card is withdrawn and subsequently the card is re-inserted which positions the card in a secondary position to receive thereon the time of the second insertion along with the codal representative thereof. This card could be applied to a job card wherein a man starting an operation records the time of the start of the operation and then, upon completion of the operation, records the time by re-inserting the card. In time control systems such as cost accounting control in a manufacturing plant, it is essential that the time of each job operation be accurately maintained. Heretofore, cards were utilized with printed time indicia thereon and at the end of a period, be manually tabulated. With the present system, a punch card tabulating machine of the type well known to those skilled in the art may be utilized to automatically tabulate these job operations since the time is also codally punched automatically in the card. This automatic feature permits an accuracy heretofore unobtainable with a minimum of effort and time and removes many of the disadvantages heretofore present in machines of this type.

Referring to the drawings in detail, 20 generally designates the time controlling mechanism which controls the printing mechanism generally designated as 30, jointly, with a punch controller generally designated as 40. The punch controller 40 and the printing mechanism 30 will be described hereinafter in detail.

Punch controlling mechanism 40 is co-operable with a card punching mechanism generally designated as 50, Figures 2, 3, and 5. The punching mechanism 50 generally comprises a reciprocating die 52 which is slideably mounted on a pair of perpendicular guide bars 54 which are mounted on a base 56. Base 56 in turn is mounted on the cover base 58. As shown in Figure 1, a cover 60 is adapted to be disposed over the mechanism of the time recorder and may be locked thereon by means not shown. The punch mechanism 50 is conventional in operation to the extent that a card 62 may be positioned in a suitable card chamber 64 and when therein, the card is disposed between a plurality of punches 66 and co-aligning perforations 68. In operation, the die 36 having the perforations 68 therein, is raised by means hereinafter described and card 62 is carried into engagement with the punches 66. Selected punches 66 are held stationary by means hereinafter described and, accordingly, the held punches perforate the card 62. Those punches 66 which are not held are raised with the card and, therefore, do not perforate said card. The die then descends to its initial position and the card may be withdrawn.

This type of card perforating operation is well known to those skilled in the art and need not be described in detail herein, except as hereinafter described.

As shown in Figures 3 and 5, a pair of spaced side plates 70 are secured to the base 58 and disposed rearwardly of the punching mechanism 50. A central shaft 72 is disposed intermediate the side plates 70 and journaled thereon is a hammer mechanism 74 co-operable with the printing mechanism 30 as hereinafter described. Shaft 72 is journaled in suitable bearings 76 as will be hereinafter apparent. A solenoid 78, having a normally raised plunger 80, is affixed to a crossbar 81 disposed intermediate a side wall 70. Plunger 80 is pivotally secured to a link 82 which is in turn pivotally secured to an arm 84 affixed to the shaft 72. Arm 84, Figure 12, has a shoulder portion 86 which normally rests within a recess 88 in the hammer arm 74. When solenoid 78 is energized by means hereinafter described, plunger 80 is depressed, link 82 is pulled downwardly and arm 84 and shaft 72 rotates clockwise as viewed in Figure 5. The shoulder 86 of the arm 84 engages a terminal portion of the recess 88 and urges hammer 74 upwardly. A resilient platen 90 is secured to the hammer 74 and this platen is adapted to strike the underside of card 62 and effect a printing operation in the well known manner as will be hereinafter apparent. The recess 88 permits the hammer 74 to gravitationally fall away from engagement with card 62 upon de-energization of solenoid 78.

Means are provided to reciprocate the die mechanism 50 and directed toward this end is a second arm designated as 92, which is affixed to shaft 72, Figure 12. Arm 92 is pivotally secured to link 94 which is in turn pivotally secured to a bell-crank 96 associated with the die mechanism. Bell-crank 96 is pivotally mounted on a shaft 98 secured between a pair of upstanding walls 100 which are integrally formed from the die base 56, Figures 2 and 5. The upper arm of bell-crank 96 is recessed to provide bifurcated tines 102 which are adapted to receive therebetween a cross-shaft 104 secured in a pair of spaced protrusions 106 integrally formed from reciprocal die 52.

Thus, it will be apparent that the clockwise movement of arm 92, Figure 5, will move link 94 leftwardly and in so doing bell-crank 96 will be similarly rotated in a clockwise direction. Shaft 104 is raised which in turn raises the die 52 to effect a punching operation.

It will be noted that the solenoid 78 jointly provides the motive power for the printing operation and for the card punching operation. These operations are substantially concurrent with the energization of the solenoid 78. Means are provided to energize the solenoid 78 as will be hereinafter apparent.

Means are provided to pivotally mount the time controller 20, the punch controlling mechanism 40 and the printing mechanism 30 on a unitary structure which may be pivotally rotated out of operative position relative to the die and printing hammer so that maintenance and inspection is readily accessible without dismantling or interrupting the sequence of operation, particularly of the time controller 20. Directed toward this end, there is provided a cross-shaft 110 which is secured between the respective side wall 70 and upon which a casting 112 is journalled. Casting 112 generally comprises a pair of side walls 114, an interconnecting base wall 116, and a bore 118 in which the shaft 110 is disposed. Side walls 114 are formed to provide a protrusion 119 which is adapted to engage a stop stud 120 affixed to the respective side walls 70. Stop stud 120 prevents rotation of the casting 112 beyond a predetermined angle in one direction while permitting rotation of the casting 112 in an opposite direction until the protrusion 119 engages a cross-shaft 122 which is disposed intermediate the side walls 70. Adjacent to the upper end of casting 112 there is disposed a crossbar 126 upon which the printing mechanism 30 is mounted. A pair of side walls 130 are secured to the casting 112 and extend forwardly to mount the punch controlling mechanism 40 thereon.

The time control mechanism is mounted on a frame piece 132 which is secured to the top side of crossbar 126 and extends at right angles therefrom. A synchronous motor 134 is mounted on the forwardly extending portion of frame piece 132. Time control unit 20 consists essentially of the synchronous motor 134 having the output shaft thereof, not shown, coupled through gear reducer 136 which has an output shaft 138. Shaft 138 is adapted to make one revolution per minute or one revolution every sixty seconds. A pinion 140 is affixed to shaft 138 and meshing therewith is a second pinion 142 affixed to shaft 144 which is journalled between a pair of supporting side plates 146. Pinions 140 and 142 have an equal number of teeth thereon and, accordingly, shaft 144 rotates at one revolution per minute. Also, affixed to shaft 144 is an eccentric cam 150. A ratchet lever 152 is pivotally mounted on a shaft 154. Also, mounted between side plates 146 and on one end of lever 152 is a follower 156 which is adapted to ride on the periphery of cam 150. The opposite end of lever 152 pivotally supports a pawl 158 which is disposed in engagement with a ratchet wheel 160. Ratchet wheel 160 is affixed to an embossed printing wheel 162 and rotates about shaft 164 journalled between a pair of spaced frame plates 166 of printing unit 30. Frame plates 166 are affixed to the crossbar 126. A spring 168 urges pawl 158 into continuous engagement with ratchet wheel 160 having 30 teeth. The embossed wheel 162 is one of four which jointly divide a twenty-four hour time period into minutes and hours. The printing portion of this time device is conventional, such as disclosed in Patent #2,687,691 to Cooper et al., issued August 31, 1954. Thus, with each rotation of cam 150, lever 152 will be urged clockwise, Figure 5, to a position wherein pawl 158 engages the next adjacent tooth on ratchet wheel 160. Continued rotation of the cam 150 permits follower 156 to fall after the high dwell portion of the cam 150 has passed thereunder. Spring 168 returns lever 152 to its most counterclockwise position and advances the printing wheel 162 one increment which is, in the particular instance, one minute of time. Adequate transfer mechanisms interconnect printing wheel 162 with the remaining printing wheels and a time series is, therefore, provided. Such transfer mechanism is described in detail in the cited patent and need not be described herein.

It is deemed sufficient to state that the print wheel 162 continuously advance in increments of one minute and through the conventional transfer mechanism, not shown, advance the hour and day wheels.

Means are provided to control the punch mechanism 50 and directed towards this end there are provided shafts 170, 172, 174 and 176 which are journalled in and disposed between the upper frame plates 130. Shafts 170, 172, 174 and 176 are geared together for relative rotation in a timed sequence.

As shown in Figures 2 and 9, a gear 180 is affixed to and rotatable with shaft 164 and, accordingly, gear 180 will complete one revolution every thirty minutes. An idler gear 182 journalled on a stud 184 is disposed in meshing engagement with gear 180. A second idler gear 186 is disposed in meshing engagement with idler gear 182 and is mounted on a stud 188. Affixed to idler gear 186 and rotatable therewith is a gear 190 which is disposed in meshing engagement with a pinion 192 affixed to shaft 176. The gear ratio between gears 164, 182, 186, 190 and 192 is such that with every revolution of gear 180, gear 192 and shaft 176 rotates one complete revolution every ten minutes or a gear ratio of 1:3 is provided. Shaft 176 has radially extending from the periphery thereof a plurality of discriminately disposed pins 200 for a purpose hereinafter appearing. Disposed at the opposite end of shaft 176 (Fig. 3) and affixed thereto is a mutilated gear 194, which is adated to engage an idler pinion 196 journalled on a stud 198. Idler pinion 198 is disposed in continuously meshing engagement with gear 199 which is secured to shaft 172. The driving arrangement between shafts 176 and 172 through the gearing 194, 196 and 199 is such that with each complete revolution of shaft 176, shaft 172 rotates one-twelfth of a revolution. Also secured to shaft 172 is a transfer gear 202 having diametrically opposite engaging portions and each portion comprises a pair of teeth. Gear 202 is disposed for intermittent engagement with an idler pinion 204 journalled on a stud 206 and which is in turn disposed in continuously meshing engagement with a gear 208. Gear 208 is affixed to and rotatable with shaft 170. Shaft 170 also has affixed thereto a transfer gear 210 having three pairs of teeth thereon spaced apart at predetermined angular increments, provided for a purpose hereinafter appearing. With each complete rotation of shaft 172, shaft 170 is advanced two increments. The ratio between shaft 170 and shafts 172 and 176 is such that shaft 170 makes one revolution every twenty-four hours. The teeth on transfer gear 210 intermittently engage an idler pinion 212 journalled on a stud 214. Idler gear 212 is disposed in continuously meshing engagement with a gear 216 which is affixed to shaft 176. Shaft 174 rotates one revolution every one hundred twenty hours. Shaft 172 has a plurality of radially extending pins 200 thereon. Shaft 170 has a drum 221 affixed thereon having a plurality of radially extending pins 200 thereon. In a like manner, shaft 174 has a plurality of radially extending pins 200 affixed to the periphery thereof.

The pins 200 on the respective shafts are radially disposed above the peripheries of the respective elements in a discriminate manner such as is shown in Figure 7, and as will be hereinafter described in detail.

Referring to Figure 5, pins 200 are provided for the purpose of controlling punches 66. The pins 200 associated with shaft 176 effectively control a plurality of interposers 224, each of which is slideably mounted on a suitable aperture in fixed frame plate 226. Interposer 224 is adapted at one end to align with a punch 66 and at the other end to intermittently, in a select pattern, align with the pins 200 on shaft 176. When interposer 224 engages a pin 200 and the die is raised with a card in the chamber, an appropriate perforation is made in the card. In a like manner, interposers 228 are provided to co-operate with the pins 200 associated with the shaft 172. Analogously, interposers 230 are associated with the pins 200 on the drum 220; and finally, interposers 232 are associated with the pins 200 on the shaft 174. A coil spring 234 is disposed circumjacently around each of the interposers 230 to assist in returning said interposers to their lowermost position. Due to the length of the interposer 230, as shown in Figure 5, said interposer is formed into two sections, an upper and a lower section. A sleeve 236 is adapted to receive the uppermost section with the coil spring 234 therearound and is secured to the fixed plate 226. A return plate 238, movable with the die, returns the interposers to their lowermost positions after a punching operation has occurred so that the pins 200 are free to rotate, as will be hereinafter described.

Figure 18:
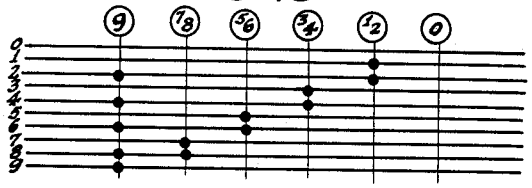
Figure 18 is a diagram illustrating the tabulating punch card code into which all time punches are transposed.
Figure 13:
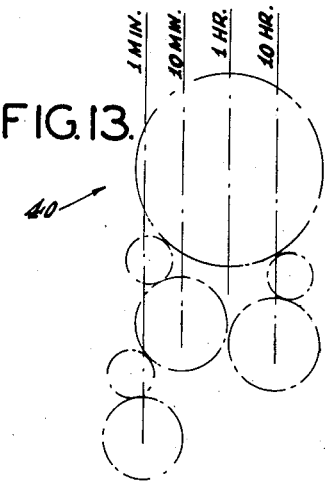
Figure 13 is a schematic diagram of the gear train.
Figure 11:
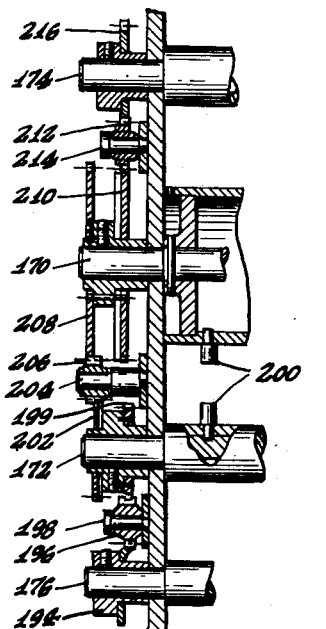
Figure 11 is a cross-section view of the transfer mechanism taken along line 11—11 of Figure 3.

It will be noted that four columns of aligned punches are provided and each column contains a series of five punches. The present perforation pattern is prescribed for the conventional Powers Code, such as shown in Figure 18 wherein four columns of information may be punched in the card. To convert the time control settings of the printing means into four digits, the pins 200 are discriminately positioned on their respective elements and a relative rotation thereof, in effect, provides a plurality of permutative interponents which act in the manner hereinbefore described. In the present instance, it is desirable to punch a codal pattern representative of a maximum of four columns of information, i.e., tens of hours, hours, tens of minutes and minutes. For example, in assuming the time to be (23.59), these four digits represent the time as being one minute before midnight, or the maximum digital representation. At the passage of the succeeding minute, the digits then change to read (00.00) and may then continuously increase in minute intervals up to the maximum. The permutation code which prescribes the disposition of the pins 200 is set forth in a diagrammatic form in Figure 17. It will be noted that the "units of minutes" consist of ten pins which are radially disposed around the periphery of the shaft 176. Each pin 200 is spaced apart from its adjacent pin and is advanced on the periphery thirty-six degrees from the preceding pin.

The tens of minutes pins 200 are disposed around the periphery of shaft 172. In this instance, six pins are disposed around one hundred eighty degrees and are each successively advanced thirty degrees one from the other. A series of six like pins 200 are disposed on the other one hundred eighty degrees of the periphery of the shaft 172 and are an exact duplicate of the first series of pins 200. These pins are likewise disposed in successive advancement of thirty degree increments. The units of hours, pins 200, which are disposed upon drum 221 on shaft 170 consist of two series of ten pins each wherein the first series of ten pins 200 are disposed around one hundred and fifty degrees of the periphery of drum 221 and each pin is successively positioned fifteen degrees in advance of the other. A duplicate set of pins 200 similarly disposed are positioned on the next succeeding one hundred fifty degrees of the periphery of drum 221. Finally, a series of four pins are positioned in advancing increments of fifteen degrees. The latter series of four pins are positioned on the remaining sixty degrees of the periphery of drum 221.

The tens of hours, as represented by the pins 200, on shaft 174, consists of four series of pins 200. Each series of pins consist of three pins which occupies ninety degrees of the periphery of drum 222 and each pin is further disposed in thirty degree increments.

An analysis of the code may be best illustrated by way of an example, such as (09.59). In the "units of minutes" series of pins, the #9 pin designated as 200a, would be positioned in alignment with its respective interposer to punch a hole in its designated column in the #9 position, such as shown in Figure 18. This, of course, would be represented as the last digit of the four digit time group. Concurrently, the #5 pin of the first series of pins in the "tens of minutes" group, designated as pin 200b, would be positioned over the appropriate interposer of its respective column which would in effect punch a hole in the card in the adjacent column in the five position, such as shown in Figure 18. In the units of hours group, the #9 pin of the first series designated as 200c would be positioned for engagement with its respective interposer so that the next adjacent column of the card would have a hole punched in the nine position thereof.

While the controlling pins have been described as single pins, it will be understood that in the event that the numerical representation is an even number then a secondary control pin will be disposed in the number 9 column in alignment with the selected control pin. The Powers Code is such that odd numbers require only a single perforation while even numbers require the single perforation plus a control perforation. This code is completely shown in Figure 18. Furthermore, in the Powers Code zero is represented by an absence of a perforation, i.e., the tabulating machines that are utilized with cards perforated with this code upon sensing the absence of perforations automatically print a zero representation.

Figure 17:
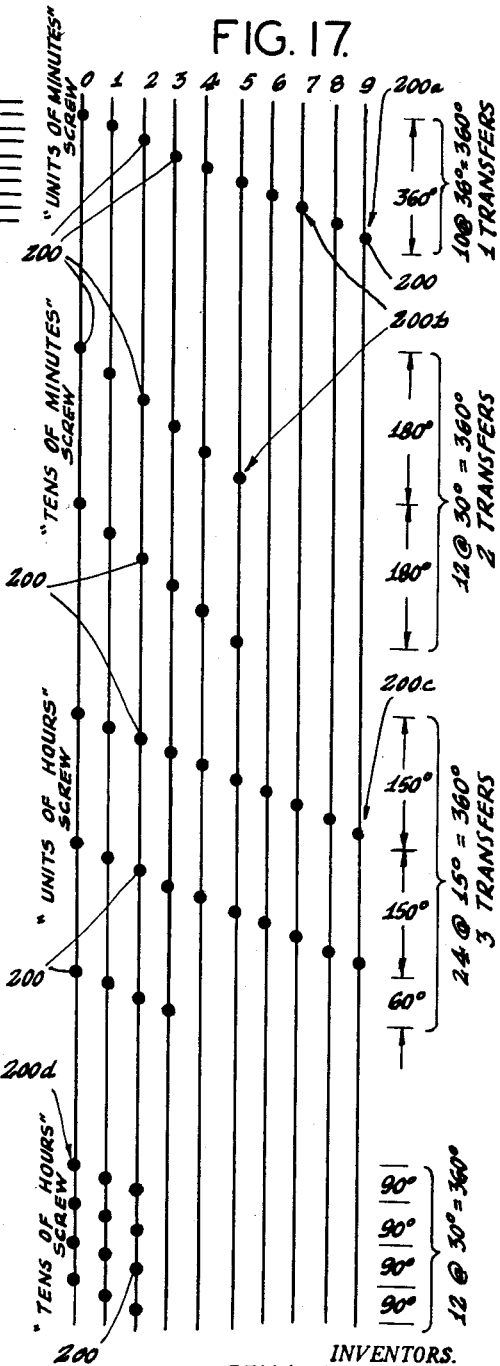
Figure 17 is a schematic diagram of the angular relationship of the punch time controlling pins illustrating the rotational degree relationship.
Figure 20:
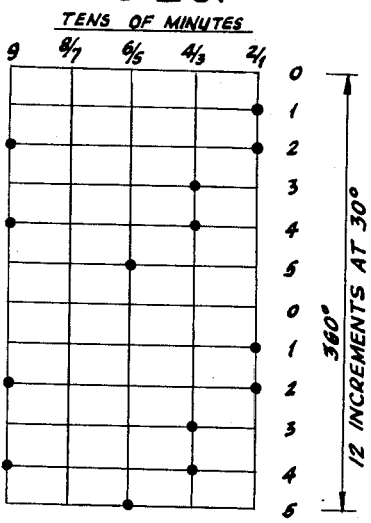
Figure 20 is a schematic diagram illustrating in planar relation the peripheral disposition of the pins controlling the tens of minutes column of time designation.
Figure 21:
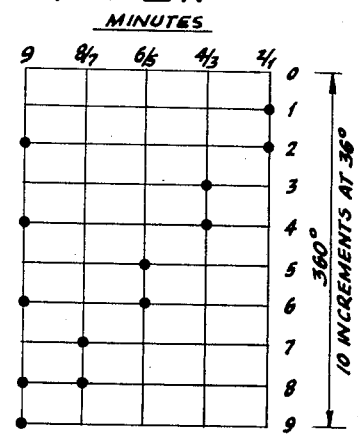
Figure 21 is a schematic diagram illustrating the discriminate disposition of the pins on the periphery of the rotary member controlling the group of punches which perforate the units of minutes time designation.
Figure 22:
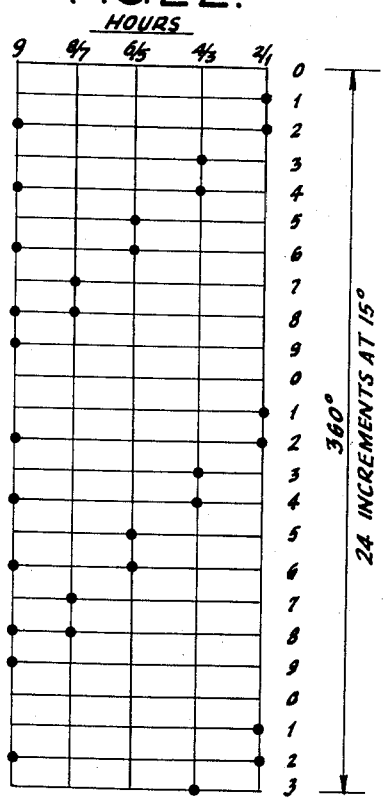
Figure 22 is a schematic representation of the pins that are peripherally disposed around the rotary member which controls the group of punches which selectively perforates the hours designation.
Figure 23:
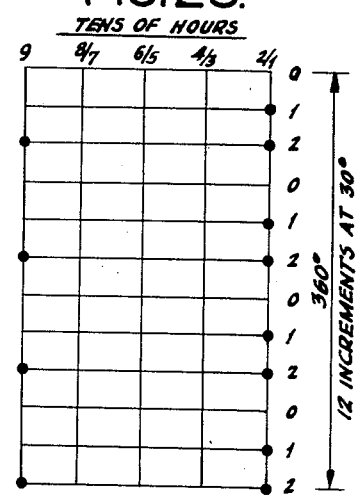
Figure 23 is a schematic illustrating the peripheral pin disposition of the rotary member which controls the tens of hour group of punches.

Therefore, the "tens of hours" group in the present example has a blank space on the zero portion of the periphery of the respective shaft. The coding, as set forth in Figure 17, is truly more representative of the peripheral area around the respective shafts rather than pin disposition. In accordance with the numbers to be codally perforated, this peripheral area may have thereon no pins as in the zero instance a discriminately disposed single pin as in the odd number instance and two pins in the even number instance.

Accordingly, analysis of the perforation pattern in the Powers Code would indicate the time punched in said card as being 09.59 or 9:59 a.m. Continuing the example, should it be desired to punch the time once more in the card, such as by way of example 10:05, a transfer operation would have occurred in several of the groups of pins, shaft 172 would have completed one revolution and would be so positioned that the #5 pin is disposed over its respective interposer. The "tens of minutes" shaft 172 would have rotated wherein the zero or blank peripheral area of the second series of pins is disposed over the respective interposers. The units of hours pins 200 on shaft 170 has rotated to a position wherein the zero or blank peripheral area of the second series of pins is disposed over the respective interposers. And, lastly, shaft 174 has rotated to where the #1 pin 200 of the first series of pins is in effective position over its respective interposer. The specific coding provided is obviously adapted to the twenty-four hour-sixty minute increments in a day, however, the highest increment punched will be two thousand, three hundred fifty-nine. Upon the succeeding minute passing, the appropriate transfers will occur and the twenty-four hour period will be designated at that minute by 00:00 representation. Should a punching occur at that instance, this zeroized representation would indicate the period as twelve o'clock midnight.

Essentially, the present invention consists of an in and out recorder; therefore, an initial time is printed and punched into a card and the same card is subsequently re-inserted within the recorder and the later time is once again printed on the card and concurrently punched therein. Obviously, the latter punching and printing operation must occur on a differing portion of the card from the portion occupied by the initial printing and punching operation. Therefore, means are provided to position the card initially when the card has no prior time perforations therein and to position the card in a differing position when the card contains a prior time perforation. Directed towards this end there is provided a positioning mechanism generally designated as 250, as illustrated in Figures 7 and 8. In order to accurately position the card relative to the punches 66, the card 62 is preperforated when manufactured with a pair of spaced control holes designated as 252 and 254, Figure 14. The card is manually inserted in the card chamber 64 until a card stop 256 engages the leading edge of the card. Continued manual movement of the card 62 moves the card stop 256 rearwardly to the position shown in dotted line of Figure 7 and in so doing a link 258, from which card stop 256 is integrally formed, similarly moves rearwardly. Link 258 is pivotally secured to an arm 260 which is rotatable about a shaft 262. Also pivotally secured to arm 260 is a link 264 which is slideably mounted in a guide piece 266. Adjustably mounted on the free end of link 264 is a contactor 268 that is adapted to engage contact 270a of a pair of normally-open contacts 270. Thus, when card stop 256 moves rearwardly link 264 similarly moves rearwardly to close the normally-open contacts 270. Contacts 270 control the circuit for energizing rotary solenoid 272. A lever 274 is affixed to the rotatable armature 276 of rotary solenoid 272 and rotates therewith when said solenoid is energized. Lever 274 is pivotally secured to a pin 278 which is slideably journalled in a guide 280. Aperture 252 in card 62 is now substantially aligned with the pin 278 and, therefore, upon energization of solenoid 272 said pin enters aperture 252 and a portion passes therethrough. Pin 278 is tapered slightly so that any misalignment of card 62 will be corrected by pin 278 as said pin moves through the aperture 252. Further, pin 278, upon moving through aperture 255 engages a pin stop 282 which is slideable in a suitable guide 284 and which is pivotally secured to arm 286 of bell-crank 288. Bell-crank 288 is pivotally secured to stud 290 and, accordingly, downward movement of pin stop 282 by pin 278 rotates bell-crank 288 counterclockwise and an insulated contactor 292 carried by arm 294 of bell-crank 288 engages a pair of normally open contacts 296 and effects the closing thereof. Contacts 296 are the controlling contacts for energizing the print and punch control solenoid 78.

The circuits for controlling rotary solenoid 276 and print and punch control solenoid 78 are illustrated in Figure 19 and will be hereinafter described in detail.

Thus, the closing of contacts 296 effects a punching and printing operation. The completion of a printing operation, by means hereinafter described, de-energizes rotary solenoid 272 permitting pin 278 to be restored upwardly and permits card 62 to be manually withdrawn. A spring 300 affixed to link guide 266 at one end and at its other end to link 264 restores card stop 256 to its initial position. Simultaneously, a spring 302 affixed to arm 294 to a bell crank 288 and to the shaft 262, restores said bell-crank clockwise and moves the pin stop 282 upwardly until it is arrested in its initial position. Thus, contacts 270 and 296 re-open.

It will be pointed out that in addition to the punches 66 perforating a pattern representative of the time in card 62, a punch 304, Figure 3, concurrently effects the punching of a slot designated as 306 in card 62. The perforation pattern and the perforated slot 306 are shown perforated in card 62, in Figure 15. Therefore, there is now provided an accurately perforated record card having the time indicia printed thereon and the corresponding time codally perforated therein. Subsequently, the record card will be re-inserted in the card chamber 64 and a second printing and perforating operation will occur. Means are provided to position the card in a secondary position for the second printing and punching operation. Directed toward this end there is provided a swtich 310 having a pair of normally closed contacts which lie in the plane of card 62, i.e., the insertion of the card 62 in the card chamber results in the opening of the normally closed contacts of switch 310. A card that is being initially punched with a time designation will retain the switch 310 in an open position and, accordingly, the card will abut against stop 256. However, as hereinbefore described, punch 304 perforated card 62 with a slot designated as 306 concurrently with the initial punching therein of a time designation. The subsequent reinsertion of card 62 with slot 306 therein into the card chamber will position said slot adjacent to the switch 310 prior to the leading edge of the card abutting against card stop 256. When card 62 is so disposed that the contacts of switch 310 can enter the slot 306 and restore to a normally closed relationship, a circuit is energized that controls a rotary solenoid 312; such circuit will be hereinafter described in detail. Solenoid 312 energizes and arm 314 thereon rotates a predetermined degree in a counterclockwise direction from the position shown in Figure 7 to the position shown in Figure 8. A link 316, pivotally secured to arm 314 at one end and card stop lever 258 at the other end, pivots said card stop lever similarly counterclockwise about its pivot point designated as 318 and lowers card stop 256 below the plane of card 62. The continued movement inwardly of card 62 introduces the leading edge of the card to a second card stop 320 which is also integrally formed with the card stop 258. The continued movement of card 62 actuates the respective normally open switches 270 and 296 in the manner hereinbefore described and a punching and printing operation occurs. Slot 306 is of such shape as to permit the closing of switch 310 while permitting sufficient continued card movement to trip the trigger mechanism switches 270 and 296. In the present application, the spacing between card stop 256 and card stop 320 is equivalent to four columns of card space. This spacing provides a fresh card area under the punches 66 and, accordingly, the second time designation may be perforated therein without disturbing or mutilating the initially punched time designation.

It will be noted that the control hole 254 perforated in the card 62 will be disposed in a position to receive pin 278 therein when the card 62 is positioned in its secondary printing and punching position. Control hole 254 analogously acts to position the card 62 in accurate registration with the punches 66.

Referring to Figures 6 and 19, the card 62 upon entering the card chamber 64 effects a switching cycle which sequentially prepares the time recorder for operation. To insure proper placement of the card 62 switch 310 cooperates with a switch 330 to condition the time recorder for proper operation. As shown in Figures 6, 14, 15 and 16, the card 62 is conventionally provided with a cut-off corner designated 62a which visibly indexes the card relative to the conventional punch card tabulating machines. To insure the proper placement of the card in the time recorder, switch 330 is so positioned transversely of the long axis of the card 62 to be in advance slightly of switch 310. Switch 330 is of the conventional micro switch construction and is provided with a roller 332 carried by an actuator 334 which controls the contacts 336 of switch 330. Switch 330 is of the normally open type and when a card is positioned in the card chamber 64 a marginal edge of the card engages the roller 332 to move said roller rightwardly as viewed in Figure 2, which carries the actuator 334 in a similar direction and effects the closing of the contacts 336. Switch 330 may be designated as the master switch which supplies a source of potential to the remaining electrical elements. However, as shown in Figure 19, switch 330 does not control the synchronous motor 134 which motivates the time unit 20. The circuit for motor 134 may be traced as follows: From a source of ACH over conductors 340 and 342 to one terminal of motor 134. The other terminal of motor 134 is connected by conductors 344 and 346 to a source of ACG. The synchronous principle of motor 134 is well known to those skilled in the art and it is obvious that ACH and ACG represent the incoming lines of a supply of 60 cycle alternating current. The closing of the master switch 330 by a card 62 completes a circuit to a rectifier bridge designated as 348 which is conventional in operation and rectifies the alternating current to provide a source of direct current potential. This circuit may be traced as follows: From ACH over conductor 340 through the now closed contacts 336 over a conductor 350 to the alternating current input terminal of the rectifier bridge 348. The alternating current terminal or rectifier bridge 348 is connected by a conductor 352 to conductor 346 which is in turn connected to a source of ACG. The direct current positive output terminal of the bridge 348 is connected by a conductor 354 to a contact of switch 310. However, with the card positioned for its initial punching cycle, as hereinbefore described, switch 310 is held open and rotary solenoid 312 cannot be actuated. However, assuming that the card 62 is being repositioned for a secondary punching operation, the slot 306 will be disposed between the contacts of switch 310 and said contacts will be engaged so that the positive D.C. potential may pass over conductor 354 through switch 310, conductors 356 and 358 to one terminal of the rotary solenoid 312. The other terminal of the rotary solenoid 312 is connected by conductor 360 to the negative direct current output of bridge 348. Accordingly, rotary solenoid 312 is actuated and the card stop 256 is moved away from the plane of card 62 and card stop 320 is positioned to be engaged by the leading edge of the card. Concurrently with the energizing of the solenoid 312, a relay 362 is energized in a parallel circuit and a pair of normally open contacts 364 are closed. Contacts 364 bridge or parallel the switch 310 and provide a holding circuit for retaining solenoid 312 in energized condition. The continued forward movement of card 62 when engaged with either card stop 256 or 320 effects the closing of contacts 270. This completes a circuit which energizes rotary solenoid 272 to move pin 278 through the respective aperture 254 or 256 in card 62 to properly position said card relative to the punches 66. This circuit may be traced as follows: From the positive direct current source over conductor 354, conductor 364a to one contact of switch 270 through the now closed switch 270 over a conductor 366 to one contact of a normally closed pair of contacts 368 associated with a relay 370. The circuit continues through the closed contacts 368 over a conductor 372 to one terminal of the coil of rotary solenoid 272. The other terminal of the coil of solenoid 272 is connected by a conductor 374 to the conductor 360 which is connected to the source of negative potential; thus, solenoid 272 is energized. As hereinbefore described, pin 278 effected the closing of contacts 296 which energized the printing and punching solenoid 78. This circuit may be traced as follows: From a source of alternating current ACH over conductor 340, through the closed master switch 330 over a conductor 374 to one contact of switch 296, through the now closed switch 296 over conductors 376 and 378 to one contact of a pair of normally closed contacts 380 associated with relay 370. The circuit continues through said closed contacts 380 over conductor 382 to one terminal of the coil of solenoid 78. The other terminal of the coil of solenoid 78 is connected by conductor 346 to a source of A.C. potential ACG. Thus, the printing and punching solenoid 78 is energized to effect a printing and punching operation. Concurrently with the energizing of solenoid 78 relay 370 is energized through a parallel circuit but, however, the energization of relay 370 is delayed a sufficient time to enable solenoid 78 to actuate its related mechanisms. This circuit may be traced as follows: From a source of ACH over a conductor 340 through the closed master switch 330 over conductor 374 through closed contacts 296 over conductor 376 through a rectifier element 384 to one terminal of the coil of electromagnetic relay 370. The other terminal of the coil of relay 370 is connected through a variable time-delay network 386 to conductor 346 which is connected to ACG. Delay network 386 retards the energization of solenoid 370 a sufficient period of time so that solenoid 78 may energize and actuate the punching and printing mechanism prior to the opening of the normally closed contacts associated with relay 370. Upon the period of time delay expiring, solenoid 370 energizes and contacts 380 and 368 open. Contacts 380 de-energize the circuit to the printing and punching solenoid 78 and, accordingly, said solenoid does not remain energized regardless of the length of time that the card 62 remains in the chamber 64.

With the energization of relay 370, a pair of normally open contacts 388 are closed which parallels the contacts 296. These contacts provide a holding circuit which holds relay 370 in energized condition. It will be noted that the rotary solenoid 272 which controls the pin 278 is deenergized upon the opening of contacts 368 associated with relay 370. This feature permits the removal of card 62 from the chamber 64.

Only when the card 62 is completely removed from the card chamber 64 and master switch 330 is allowed to reopen does relay 370 deenergize. In a like manner, relay 362 deenergizes only upon the removal of the card and the opening of the master switch 330. The above circuits have been described in a normal operating procedure when the card 62 is positioned properly in the chamber 64. In the event that the corner of the card designated as 62a is inadvertently or purposely positioned in the opposite side of the card chamber then a differing sequence of operation occurs which prevents a printing or punching operation. As hereinbefore set forth, switch contacts 296 controlled the energization of the printing and punching 78. Accordingly, all of the sequence of operations hereinbefore described may occur but without the actual closing of the contacts 296 a printing or punching operation cannot occur. It will be noted that the pin 278 will not engage the aperture 252 or 254 if the card 62 is incorrectly positioned in the card chamber 64. Obviously, the pin 278 cannot actuate the switch closing mechanism if said pin is restrained from passing through the card 62. The thickness of the card is sufficient to overcome the pressure exerted on the pin 278 by means of the rotary solenoid 272. Therefore, an operator will automatically realize from the failure of the time recorder to perforate the card, that the card has been inserted incorrectly. The card may be removed and correctly re-inserted without the possibility of incorrectly perforating said card.

In reference to Figure 4, there is shown a ribbon reverse mechanism generally designated as 390, which consists of a pair of ratchets 392 and 394 and interengaging lever-pawl 396. Lever-pawl 396 is pivotally mounted in an over-the-center toggle device shown as 398 which is actuated by the supply of ribbon on the ribbon spools, not shown, but which would be respectively controlled by the ratchets 392 and 394. The ratchet mechanism is arranged to be actuated by a lever 400 which is controlled by the solenoid 78. The ribbon reverse mechanism is substantially conventional and need not be described in detail herein. It is deemed sufficient to state that the ribbon area 402 disposed under the printing wheels 62 is continuously changed with each printing operation and when the supply of ribbon nears the end of the roll, then the ribbon reverse mechanism is actuated and the lever-pawl 396 is pivoted over the center wherein each printing operation effects the movement of the ribbon 402 in an opposite direction.

Thus, it is apparent that there has been provided a device in which the several objects of the invention are achieved and which is well adapted to meet the conditions of practical use.

While there has been shown and described a single embodiment of the invention, it is to be understood that modifications and changes might be made without departing from the scope of the present invention, except as limited by the within claims.

The invention claimed is:

1. In combination, in a time stamp having a base and a head pivotally mounted thereon a card chamber disposed in said base and adapted to receive a card therein, a plurality of coaxially mounted printing wheels disposed adjacent to the card chamber and mounted on said head, a printing hammer adapted to move a card in said card chamber into printing engagement with said plurality of printing wheels, time control means mounted on said head and adapted to position said plurality of printing wheels in time relationship wherein increments of time will be printed on said card, a plurality of punches mounted on said base and disposed adjacent to said card chamber and adapted to perforate a portion of said card differing from the portion of said card that is adapted to receive a print thereon, means to actuate said card punches, means to operate the printing hammer and punch actuating means simultaneously, punch control means mounted on said head responsive to said time control means to selectively control said punches wherein actuation of said punches will perforate a codal pattern of the printed time increments, and said head being pivotally movable wherein said printing means, said time control means and said punch control means may be moved out of operative relationship with their respective members without interrupting the time relationship therebetween.

2. In combination, in a perforating time stamp having a base and head pivotally mounted thereon, card perforating means mounted in said base comprising pluralities of normally inoperative punches, a reciprocal die, a card chamber disposed between said die and said punches adapted to receive a card therein, means to reciprocate said die to carry a card in said card chamber into engagement with said pluralities of punches, a plurality of rotary members mounted in said head, each corresponding to a plurality of said punches, and each having a plurality of pins disposed radially on the periphery thereof, time control means mounted in said head, means responsive to said time control means to rotate said plurality of rotary members in differential time increments, and pluralities of interposers mounted in said base adapted to be aligned with the pluralities of pins on said rotary members respectively and corresponding pluralities of punches wherein those punches aligned with the pins abut against said pins to perforate the card and the remaining punches move freely with the card, said head being adapted to be pivotally moved wherein the pins on said rotary members are moved out of alignment with the respective interposers without interrupting the time relationship of the rotary members so that with the repositioning of the head the pins may once more be aligned with the respective interposers.

3. In a device, according to claim 2, wherein the time control means comprises a synchronous electric motor having output means continuously and repetitively actuated once each minute of time.

References Cited in the file of this patent

UNITED STATES PATENTS

| | | |
|---|---|---|
| 1,206,089 | Bryce | Nov. 28, 1916 |
| 1,219,765 | Peirce | Mar. 20, 1917 |
| 1,299,197 | Larrabee | Apr. 1, 1919 |
| 1,469,988 | Bryce et al. | Oct. 9, 1923 |
| 1,812,620 | Braitmayer | June 30, 1931 |
| 2,268,924 | Cooper | Jan. 6, 1942 |
| 2,338,180 | Harrison | Jan. 4, 1944 |
| 2,736,023 | Williams | Feb. 21, 1956 |
| 2,755,995 | Black | July 24, 1956 |